United States Patent

West et al.

[11] 4,219,046
[45] Aug. 26, 1980

[54] PLUG VALVE AND METHOD

[75] Inventors: Walter H. West, Bay City; E. D. Prueter, Saginaw, both of Mich.

[73] Assignee: The Dow Chemical Company, Midland, Mich.

[21] Appl. No.: 925,082

[22] Filed: Jul. 17, 1978

[51] Int. Cl.² .................. F16K 5/02; F16K 25/00
[52] U.S. Cl. .................. 137/375; 251/184; 251/309; 264/320
[58] Field of Search ............. 137/375; 251/309, 184; 264/320; 29/157.1 R

[56] References Cited

U.S. PATENT DOCUMENTS

| 2,525,831 | 10/1950 | Scherer | 29/157.1 R |
|---|---|---|---|
| 3,108,779 | 10/1963 | Anderson | 251/184 |
| 3,336,939 | 8/1967 | Freed et al. | 264/320 |
| 3,488,033 | 1/1970 | Priese | 251/184 |
| 3,703,910 | 11/1972 | Smith | 137/375 |
| 3,825,030 | 7/1974 | Kalsi | 137/375 |
| 3,916,943 | 11/1975 | Hester et al. | 251/309 |
| 3,948,284 | 4/1976 | Walworth | 137/375 |
| 4,108,418 | 8/1978 | Ensign et al. | 137/375 |
| 4,136,709 | 1/1979 | Rogers et al. | 137/375 |

Primary Examiner—Martin P. Schwadron
Assistant Examiner—A. M. Chambers
Attorney, Agent, or Firm—R. B. Ingraham

[57] ABSTRACT

A thermoplastic lined plug valve is prepared using a plug having a nonlocking taper and a stem at the small end of the plug. The plug is seated initially by forcing the plug into the plug cavity, raising the temperature of the plug valve above the service temperature of the valve body lining until the valve body lining conforms to the valve plug. The valve is then cooled to a temperature below the service temperature of the body lining.

3 Claims, 3 Drawing Figures

PLUG VALVE AND METHOD

In many applications piping is desired which has a lining of a generally chemically resistant synthetic resinous thermoplastic material. Usually, such lined conduits and lined piping systems are employed in applications where substantial mechanical protection is required and glass or plastic pipe would neither be safe nor suitable. Such lined piping systems are well known and frequently employ with benefit plastic-lined plug valves. Such plug valves usually comprise a plastic-lined cast iron or steel body and have a metal cored plug which is also plastic-coated and lined. Plug valves are generally a reliable shut-off means in a plastic-lined piping system. Such so-called plastic-lined plug valves have presented substantial problems over the years. Often, in order to obtain a desired degree of seating, auxiliary means have been employed to force a tapered plug into the plug-receiving cavity of the valve. Sometimes this is accomplished by means of a spring or bolt bearing directly or indirectly against the plug. Some plug valves, including plastic-lined plug valves, resist turning of the plug within the valve to quite a high degree. Occasionally, such resistance is overcome by providing some means of moving the plug axially within the plug-receiving cavity in such a manner that it at least partially disengages from the plug-seating surfaces within the valve body in order to permit turning of the plug within the valve body. Oftentimes, when excessive torque is applied to conventional lined valves, the friction between the plug and adjacent lining of the body can be sufficient to cause tearing or spalling of portions of the lining material.

It would be desirable if there were available an improved plastic-lined plug valve which had desirable sealing characteristics and required relatively little torque to rotate the plug within the valve.

It would also be desirable if there were available an improved method for the seating of a plug within the plastic-lined valve body.

It would also be desirable if there were available an improved plastic-lined plug valve of simple construction.

These benefits and other advantages in accordance with the present invention are achieved in a plastic-lined plug valve, the plastic-lined plug valve comprising in cooperative combination a valve body having a first or entrance port and a second or exit port, the entrance and exit ports being in full communication with a generally frustoconical plug-receiving cavity, the plug-receiving cavity having a first end of lesser diameter and a second end of major diameter, the plug-receiving cavity being in communication with a plug stem receiving passage at its first end, the plug-stem receiving passageway being in communication with space external to the valve body, a synthetic resinous thermoplastic lining disposed within the valve body, a valve plug disposed within the valve passageway, the valve plug generally conforming to the plug-receiving cavity, the plug defining an aperture therethrough and on rotation of the plug within the plug-receiving cavity providing selective communication between the first and second ports, the improvement which comprises first and second rigid foraminous generally annular members within the lining within the plug-receiving cavity, the first rigid foraminous annular member in the region of lesser diameter and the second rigid foraminous annular member in the region of maximum diameter, the rigid foraminous members being generally embedded within the plastic lining at a location adjacent the plug body and the plug and plug-receiving cavity of the valve tapering sufficiently that the taper of the plug and cavity is self-releasing.

By the term "self-releasing" is meant that the plug and body will not stay together by virtue of friction between the plug and body in the region of the plug-receiving cavity when the plug and body are hand-assembled.

Also contemplated within the scope of the present invention is an improved method for the preparation of a plug valve, the steps of the method comprising providing a plastic-lined plug valve body, the plastic lining thereof having a service temperature, providing a plug suitable for use with the plug body, the plug being finished to a desired degree of taper, disposing the plug within the body, tensioning the plug into the plug-receiving cavity of the valve body, raising the temperature of the valve body and plug above the service temperature of the plastic lining of the valve body and forcing the plug into the cavity to thereby deform the liner of the valve body to conform to the valve plug and subsequently cooling body and plug below the service temperature of the valve body lining.

A wide variety of thermoplastic materials are employed for the lining of pipe. More common of these include: fluorocarbon polymers such as polytetrafluoroethylene, various thermoplastic copolymers of tetrafluoroethylene, polyvinylidenefluoride and the like; also used are vinylidenechloride copolymers, polypropylene and the like. Each of the lining materials has a service temperature. The service temperature can be dependent on the design of the particular fitting or pipe, the manner in which the particular fitting was lined, and the material it is in contact with in normal service. The service temperature in some cases will depend on the particular formulation of the plastic material employed, for example, the kind and quantity of plasticizer can change the service temperature. In general, the manufacturer of lined pipe products through various tests determines under what conditions his products can provide reasonable service to the purchaser. In most instances, the service temperature of a plastic lining within a pipe or fitting is a temperature below the temperature that the plastic material will flow significantly under moderate pressure, for example, polypropylene shows little or no tendency to flow in a piping system at a temperature of 200° F. and under pressure of about 200 pounds per square inch. However, minor very slow flow will be obtained if it is maintained under pressure and the temperature is raised to 250° F.

Plug valves in accordance with the present invention differ from the known lined plug valves in (1) the plug has a nonlocking taper, for example, an included angle of at least 16° or more provides a plug which does not lock in a mating socket having a like angle; and (2) perforate rigid annular rings such as metal rings are embedded within the lining within the plug-receiving cavity and adjacent the valve body. These perforate rigid rings embedded within the plastic-lined material serve to stabilize the liner in the region of the seats. Plastic-lined plug valves in accordance with the present invention are readily prepared using conventional lining techniques with the addition of rigid rings such as metal screen or perforated metal annular rings incorporated within the lining. Such annular rings may be preformed by punching from a flat sheet or alternatively may be formed from a flat strip, tack-welded in position within the die body prior to lining with plastic or alternatively formed by a rubber blanket under pressure or like techniques well known to the art.

Further features and advantages of the present invention will become more apparent from the following specification taken in connection with the drawing wherein.

Figure 1:
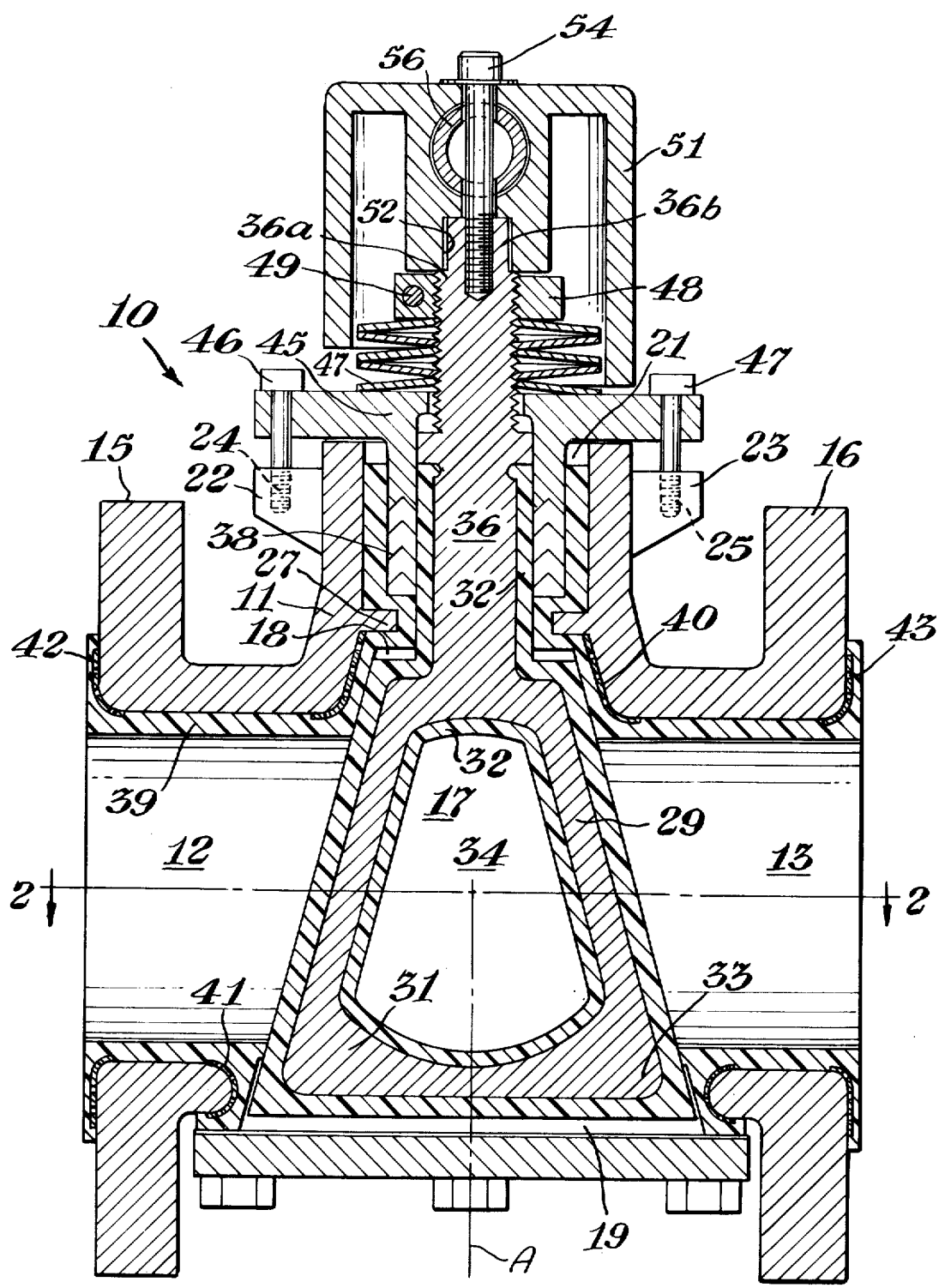
FIG. 1 is a sectional representation of one embodiment of a valve in accordance with the present invention.

In FIG. 1 there is illustrated a sectional view of a valve in accordance with the present invention generally designated by the reference numeral 10. The valve 10 comprises a valve body 11. The valve body 11 defines a first or entrance port 12 and a second or exit port 13. A first radially extending flange 15 is disposed about the port 12 and a like flange 16 about the port 13. The valve body 11 defines a plug-receiving cavity 17 in full communication with ports 12 and 13. The plug-receiving cavity 17 has a generally frustoconical configuration. Cavity 17 has a first or end of minor diameter 18 and a second end of major diameter 19. The cavities 12 and 13 have a generally central axis as designated by the line 2—2. The cavity 17 has an axis designated by the letter "A". The axis of the cavities 12 and 13 and the axis "A" of cavity 17 are disposed at generally right angles to each other. The body 11 defines a stem passage 21 disposed adjacent to first end 18 of cavity 17 and generally coaxial therewith. The passageway 21 communicates with space external to the body 11. The body 11 adjacent and external to the passageway 21 defines a pair of diametrically disposed bosses 22 and 23, each having an internally threaded passage 24 and 25 respectively. The body 11 at the junction of passageway 21 and end 18 of cavity 17 defines a radially inwardly projecting flange 27. Disposed generally within the cavity 17 is a plug 29. The plug 29 comprises a core portion 31 and a liner or coating portion 32. The plug 29 has a first or minor end 32 and a major end 33. The plug 29 is of generally frustoconical configuration and conforms generally to the generating line of the frustoconical cavity 17. The plug 29 has a port 34 passing entirely therethrough and as depicted in FIG. 1, the plug 29 is in the closed position. Plug 29 has a stem 36 rigidly affixed thereto. The stem 36 is of generally cylindrical configuration and is coaxially disposed with the plug 29 and the axis "A". A packing 38 is disposed about the stem 36 within the passageway 21 and between a portion of the lining 32 of plug 29 and the valve body lining 39. An annular perforate ring 40 of perforated metal is disposed within the first end 18 of the cavity 17 and is embedded within the lining. The ring 40 is disposed generally adjacent the body 11. A second perforate rigid foraminous ring 41 is disposed within the liner in the second end 19 of the cavity 17. Generally radially extending rings of perforate metal 42 and 43 are disposed within the liner 39 adjacent working faces of flanges 15 and 16 respectively. A packing gland 45 of the bolt-on variety is disposed above the packing 38 and is urged downwardly toward flange 27 by means of bolts 46 and 47 which engage threaded cavities 24 and 25, respectively. The stem 36 has an externally threaded portion 36a remotely disposed from the packing 38 and the plug 29. A portion of the threaded portion 36a has disposed thereon a plurality of cone, spring or Belleville washers designated by the reference numeral 47. The washer immediately adjacent the body 11 engages and rests upon body 11. A split nut 48 having a locking screw 49 is disposed upon the threaded portion 36a and is utilized to compress the Belleville springs 47 to a desired degree. A combination cap and stop 51 is affixed to stem 36 by means of a rectangular cavity 52 into which projects a square end 36b of stem 36. Between the cap 51 and adjacent portions of the housing 11, each are recessed such with the cap 51 in place. The plug may be rotated a maximum of 90°. A cap screw 54 passes through the cap 51 and a length of pipe 56 which extends generally at right angles to axis "A". The pipe 56 acts as an operating handle.

Figure 2:
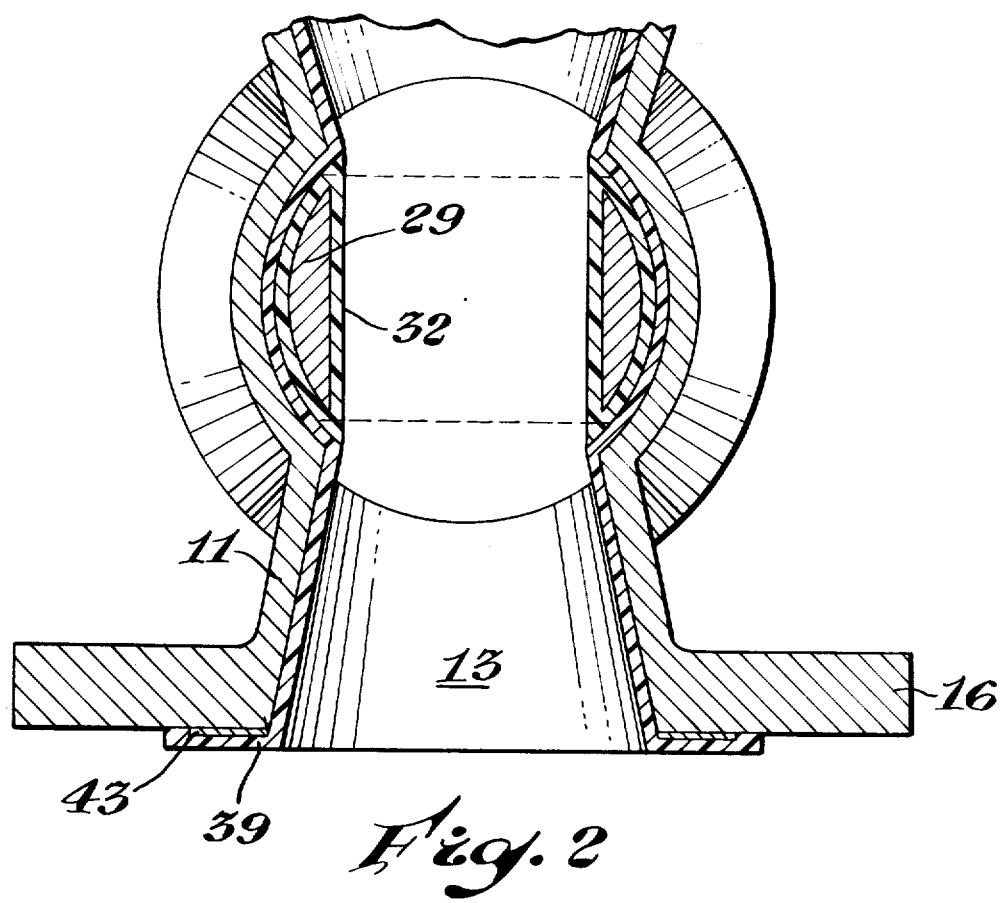
FIG. 2 is a sectional view through the valve of FIG. 1 along the line 2—2 thereof.

FIG. 2 shows a cross-section of the valve along the line 2-2 with the plug 29 in the open position, that is, rotated 90° from that shown in FIG. 1.

Figure 3:
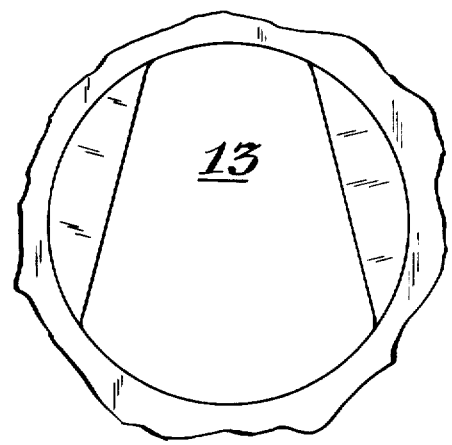
FIG. 3 is an end view of one of the ports of the valve of FIG. 1 with plug removed.

FIG. 3 is an end view of port 13 with the plug removed illustrating the tapering nature of both the ports 12 and 13.

A test valve body and plug core were prepared from steel bar stock. The plug body was above five and one-half inches square and about four inches in thickness. A through-passage was drilled in the body extending from end-to-end having a diameter of about two and one-eighth inches. At each end of the passage for a distance of about three-eighths of an inch, it was enlarged to a diameter of about two and three-eighths inches. A generally frustoconical cavity was formed in the body. The cavity had a depth of three and one-eighth inches, and a minor diameter of about one and one-sixteenth inches. The frustoconical cavity had an axis of generation normal to the axis of the through-passage. Adjacent the large open end of the frustoconical cavity, a three-sixteenths inch deep recess was formed having a diameter of about five and one-fourth inches. A stem passage having a diameter of about seven-eighths of an inch was bored coaxially with the frustoconical cavity leaving an annular flange about one-eighth inch thick. Between the two cavities, the inside diameter of the flange was about one and one-fourth inches. A plug core was fabricated from steel. The plug core had a maximum diameter of about three and five-eighths inches, a minor diameter of about one and five-eighths inches and a height of about two and one-quarter inches. A plug passage having a diameter of about two inches was formed in the frustoconical portion of the plug core, the axis of the passage being generally normal to the axis of generation of the plug core. Integral with the plug was a generally cylindrical stem about four inches in length affixed to the small end of the plug. Adjacent to the plug, the diameter of the stem was three-fourths of an inch and remote from the core, a diameter of about one inch. The terminal portion of the stem was formed to a three-fourths inch square cross-section to permit engagement with a handle. Immediately adjacent the square section of the stem and toward the plug, about one inch of the one-inch diameter portion of the stem was threaded. A square portion of seven-sixteenths inch thick plate five and one-quarter inches square bolted to the valve body was employed to close the major opening of the frustoconical plug-receiving cavity. A bolt-on packing gland was affixed to the body adjacent the stem passageway opening. Three Belleville spring washers surrounded the stem exterior to the valve body and were forced against the packing plan by means of a nut threadably engaging the stem. In some instances, prior to lining the valve body, a ring of perforated steel screen was positioned within the valve body in locations corresponding to locations 40 and 41 of FIG. 1. The screen employed was 0.050 in thickness, had five-thirty seconds of an inch diameter holes on three-sixteenths of an inch centers and the centerlines of openings of adjacent holes of adjacent rows were disposed at an angle of about 45°. The steel screen was conformed to the interior of the valve body by hammering. The valve body and plug were then lined or coated by transfer molding. The valve body lining had a slightly raised seating face around the openings within the body. The seating face was about one-fourth inch in width and about a thirty-second of an inch in height. Various lining materials were employed for both plug and body and the resultant valve tested hydrostatically at various pressures. The stem nut bearing on the Belleville washers provided a means of varying the static load on the plug. The torque required to tighten the nut was employed as indication of the relative plug load is set forth in inch-pounds and in the table is under the column headed "plug load". The torque required to turn the plug from the off to the on position is indicated in foot-pounds at various water pressures and is set forth under the heading of Line Pressure in the Table. The valve manufacturers' standards for valves permits a leakage of 10 milliliters of water per inch of nominal valve diameter and leakage as indicated by the volume of liquid leaking through the valve over a period of three minutes and is set forth under the heading of 3 Min. Leak. The results are set forth in the following Table wherein tests 10 and 11 are for comparative purposes only and are results obtained using commercially available two-inch plug valves which were tested with plugs greased as originally shipped from the manufacturer. In tests 1 through 9, each of the plugs was machined to provide an included angle of about 45° utilizing as a cutting tool a sintered polycrystalline diamond tool insert commercially available from Megadiamond Industries, 589 Fifth Avenue, New York, New York. Prior to testing of valves 1 through 9 of the Table, they were assembled and the nut on the plug turned on the stem with a torque wrench until the torque was indicated to be three foot pounds. The load on the stem was estimated to be about sixty pounds. The valve assembly was heated in a circulating air oven at a temperature of about 250° F. for about 2 hours, subsequently cooled to room temperature and the pressure tested.

The heat treatment of the assembled valve at 250° F. effectively coins the lining to provide a valve with a substantially improved sealing-over valves obtainable to machined mating surfaces on the lined valve body cavity external to the surface of the plug. As can be seen from the Table, valves in accordance with the present invention having a large angle plug have an operating torque which is proportional to line pressure and if the lining material for the plug and the body are selected from pairs of materials which tend to minimize the friction, relatively low torque valves are obtained which require low torque at relatively high pressures.

In Tests 1 through 9, no grease was applied to the plug or seat. Commercially available ball valves using a fluorinated ethylene propylene coated ball and polytetrafluoroethylene seat, when well-greased, require a torque of 11 to 12 pounds to operate at pressure up to 200 pounds. The line pressures do not appear to alter the torque required for operation of the valve. Ungreased conventional lined plastic plug valves require torques of 45 foot pounds and up for operation. Valves in accordance with the invention when greased, that is, the plug coated with grease, require very low torque to open or close. At a line pressure of about 80 pounds per square inch (psi) a valve of the invention requires 27 foot pounds of torque before heat treatment, about 10 or 15 foot pounds of torque after heat treatment and when greased only 3 foot pounds of torque to open.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a plastic-lined plug valve, the plastic-lined plug valve comprising in cooperative combination a valve body having a first or entrance port and a second or exit port, the entrance and exit ports being in full communication with a generally frustoconical plug-receiving cavity, the plug-receiving cavity having a first end of lesser diameter and a second end of major diameter, the plug-receiving cavity being in communication with a plug stem receiving passage at its first end, the plug-stem receiving passage being in communication with space external to the valve body, a synthetic resinous thermoplastic lining disposed within the valve body parts and plug receiving cavity, a valve plug disposed within the plug-receiving cavity, the valve plug generally conforming to the plug-receiving cavity, the plug defining an aperture therethrough and on rotation of the plug within the plug-receiving cavity providing selective communication between the first and second ports, the improvement which comprises first and second rigid foraminous generally annular members within at least a portion of the lining within the plug-receiving cavity, the first rigid foraminous annular member in the region of lesser diameter and the second rigid foraminous annular member in the region of maximum diameter, the rigid foraminous members being generally embedded within the plastic lining at a location adjacent the plug and the plug and plug-receiving cavity of the valve tapering sufficiently that the taper of the plug and cavity is self-releasing.

2. The valve of claim 1 wherein the plug has a coat of a fluorocarbon polymer and the valve body lining is polypropylene.

3. The valve of claim 1 wherein the plug is resiliently tensioned into the plug-receiving cavity.

* * * * *

UNITED STATES PATENT AND TRADEMARK OFFICE
CERTIFICATE OF CORRECTION

PATENT NO. : 4,219,046

DATED : August 26, 1980

INVENTOR(S) : Walter H. West and E. D. Prueter

It is certified that error appears in the above—identified patent and that said Letters Patent is hereby corrected as shown below:

Column 4, line 25, delete "above" and insert --about--.

Column 4, line 35, following "generation" insert --generally--.

Column 5, line 22, following "load" insert --and--.

Column 5, line 50, insert the attached Table (3 pages).

Column 6, line 5, delete "pressure" and insert --pressures--.

Column 6, line 40, delete "parts" and insert --ports--.

Signed and Sealed this

Twenty-seventh Day of January 1981

[SEAL]

Attest:

RENE D. TEGTMEYER

*Attesting Officer*     *Acting Commissioner of Patents and Trademarks*

TABLE

| Plug and Body Materials | Test No. | Line PSI | 3 Min. Leak | Plug Load | Turn Torque |
|---|---|---|---|---|---|
| Plug - PFA<br>Body - Polypropylene with 1/2% Silicone DC 200 Oil | 1 | 25 | 1 Drop | 0 | 1 Ft/lb |
| | | 50 | <1 Drop | 0 | 2 Ft/lb |
| | | 100 | 1 Drop | 0 | 4 Ft/lb |
| | | 150 | 1 Drop | 0 | 5 Ft/lb |
| | | 220 | 0 | 0 | 7 Ft/lb |
| | | 25 | 0 | 10 In/lb | 2 Ft/lb |
| | | 50 | 0 | 10 In/lb | 3 Ft/lb |
| Plug - PFA<br>Body - 20% Polytetrafluoroethylene 2% DC 200 Oil in Polypropylene | 2 | 0 | — | 0 | 7 Ft/lb |
| | | 125 | <1 Drop | 0 | 5 Ft/lb |
| | | 200 | 1 Drop | 15 In/lb | 8 Ft/lb |
| | | 50 | 3 Drops | 15 In/lb | 3 Ft/lb |
| | | 75 | 3 Drops | 15 In/lb | 4 Ft/lb |
| | | 100 | 4 Drops | 15 In/lb | 5 Ft/lb |
| | | 150 | 1 Drop | 15 In/lb | 7 Ft/lb |
| | | 200 | 4 Drops | 20 In/lb | 9 Ft/lb |
| | | 50 | 2 Drops | 20 In/lb | 3-1/2 Ft/lb |
| | | 100 | 2 Drops | 20 In/lb | 5 Ft/lb |
| | | 215 | 0 | 20 In/lb | 10 Ft/lb |
| Plug - PFA<br>Body - 1/2% Krytox Fluorocarbon Oil in P.P. | 3 | 0 | — | Finger Tight | 7.0 In/lb |
| | | 50 | 0.4 cc | | 3.0 Ft/lb |
| | | 100 | 0.8 cc | | 5.5 Ft/lb |
| | | 150 | 1.0 cc | | 7.5 Ft/lb |
| | | 200 | 0.7 cc | | 11.0 Ft/lb |

TABLE (continued)

| Test No. | Plug and Body Materials | Line PSI | 3 Min. Leak | Plug Load | Turn Torque |
|---|---|---|---|---|---|
| 4 | Plug - PFA<br>Body - 1/2% Krytox | 0<br>50<br>100<br>150<br>200<br>0<br>50<br>100<br>150-170<br>200 | —<br>0.6 cc<br>0.6 cc<br>0.6 cc<br>2 Drops<br>—<br>0.3 cc<br>2 Drops<br>1 Drop<br>0 | 15 In/lb<br>15 In/lb<br>15 In/lb<br>15 In/lb<br>15 In/lb<br>20 In/lb<br>20 In/lb<br>20 In/lb<br>20 In/lb<br>20 In/lb | 15 In/lb<br>2.5 Ft/lb<br>6.0 Ft/lb<br>9.0 Ft/lb<br>12.0 Ft/lb<br>2.0 Ft/lb<br>3.5 Ft/lb<br>7.0 Ft/lb<br>11.0 Ft/lb<br>12.0 Ft/lb |
| 5 | Plug - polypropylene<br>Body - 1/2% DC 200 Oil<br>+ 20% polytetrafluoroethylene in polypropylene | 0<br>50<br>100 | —<br>1.1 cc<br>0.5 cc | 0 | 2 Ft/lb<br>7 Ft/lb<br>13 Ft/lb |
| 6 | Plug - Polypropylene &<br>1/12% DC 200<br>Silicon Oil<br>Body - 1/2% DC 200<br>Silicon Oil +<br>20% PTFE in polypropylene | 50<br>100<br>200 | .5 cc<br>0<br>0 | 20 In/lb<br>20 In/lb<br>20 In/lb | 6.5 Ft/lb<br>12.0 Ft/lb<br>22.0 Ft/lb |
| 7 | Plug - Polypropylene with 20% Milled Fiberglass<br>Body - polypropylene with 15% polytetrafluoroethylene & 1/2% Dow Corning DC 200 Silicone Oil | 50<br>150<br>150<br>200 | 1 Drop<br>0<br>0<br>0 | 10 In/lb<br>10 In/lb<br>10 In/lb<br>10 In/lb | 7 Ft/lb<br>17 Ft/lb<br>25 Ft/lb<br>30 Ft/lb |

TABLE (continued)

| Test No. | Plug and Body Materials | Line PSI | 3 Min. Leak | Plug Load | Turn Torque |
|---|---|---|---|---|---|
| 8 | Plug & Body Polypropylene 1/2% Krytox Fluorocarbon Oil in P.P. | 0<br>50<br>100<br>150<br>200 | —<br>2 Drops<br>1 Drop<br>2.5 Drops<br>0 | 7 In/lb<br>7 In/lb<br>7 In/lb<br>7 In/lb<br>7 In/lb | 2.0 Ft/lb<br>7.5 Ft/lb<br>18.0 Ft/lb<br>26.0 Ft/lb<br>32.0 Ft/lb |
| 9 | Plug – Polypropylene + 20% Milled Fiber Glass Body – Polypropylene 1/2% Krytox Fluorocarbon Oil in P.P. | 0<br>50<br>100<br>150<br>220 | —<br>0.3 cc<br>2 Drops<br><1 Drop<br><1 Drop | Finger Tight | 3.0 Ft/lb<br>12.0 Ft/lb<br>23.0 Ft/lb<br>32.0 Ft/lb<br>43.0 Ft/lb |
| 10 | Kynar 2" Valve, plug Kynar – Body Seat PTFE Greased as received | 0<br>50<br>100<br>200 | 0<br>0<br>0<br>0 | ---<br>---<br>---<br>--- | 22.0 Ft/lb<br>22.0 Ft/lb<br>22.0 Ft/lb<br>22.0 Ft/lb |
| 11 | Fluorinated ethylene propylene 2" Valve Plug FEP – Body Seat PTFE Greased as received | 0<br>200 | 0<br>0 | ---<br>--- | 12.0 Ft/lb<br>12.0 Ft/lb |